US012337587B2

(12) United States Patent
Tanaka et al.

(10) Patent No.: US 12,337,587 B2
(45) Date of Patent: Jun. 24, 2025

(54) IMAGE RECORDING APPARATUS

(71) Applicant: BROTHER KOGYO KABUSHIKI KAISHA, Nagoya (JP)

(72) Inventors: Mitsugi Tanaka, Nagoya (JP); Yoshikazu Shimizu, Kasugai (JP); Takahiro Nishimoto, Ogaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 88 days.

(21) Appl. No.: 18/053,114

(22) Filed: Nov. 7, 2022

(65) Prior Publication Data

US 2023/0144530 A1 May 11, 2023

(30) Foreign Application Priority Data

Nov. 11, 2021 (JP) ................................ 2021-183928

(51) Int. Cl.
*B41J 11/00* (2006.01)
*B41J 2/325* (2006.01)

(52) U.S. Cl.
CPC ............ *B41J 11/002* (2013.01); *B41J 2/325* (2013.01); *B41J 11/007* (2013.01)

(58) Field of Classification Search
CPC .... B41J 11/002; B41J 3/4078; B41J 11/0021; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598
See application file for complete search history.

(56) References Cited

U.S. PATENT DOCUMENTS

| | | | | |
|---|---|---|---|---|
| 9,327,524 | B1 | 5/2016 | Yamada et al. | |
| 2010/0039488 | A1* | 2/2010 | Silverbrook | B41J 15/044 347/102 |
| 2016/0129698 | A1 | 5/2016 | Biglari et al. | |
| 2021/0178787 | A1 | 6/2021 | Tanaka et al. | |

FOREIGN PATENT DOCUMENTS

| | | | |
|---|---|---|---|
| JP | 2001212948 | A | 8/2001 |
| JP | 2013119214 | A | 6/2013 |
| JP | 2016094001 | A | 5/2016 |
| JP | 2016112855 | A | 6/2016 |
| JP | 2021094841 | A | 6/2021 |

* cited by examiner

*Primary Examiner* — Mariah S Shah
(74) *Attorney, Agent, or Firm* — Scully, Scott, Murphy & Presser, PC

(57) ABSTRACT

There is provided an image recording apparatus including: a casing; a first cover configured to move to an open position and to a close position; a conveyor configured to convey a sheet in a conveying direction; a recording head configured to discharge a liquid onto the sheet; a heater configured to heat at least one of the sheet and the liquid discharged to the sheet; a second cover configured to cover the heater. The second cover is configured to move to a cover position at which the second cover covers the heater so that the heater is not exposed to the outside and to an expose position at which the second cover allows the heater to be exposed to the outside.

8 Claims, 9 Drawing Sheets

IMAGE RECORDING APPARATUS

REFERENCE TO RELATED APPLICATIONS

This application claims priority from Japanese Patent Application No. 2021-183928 filed on Nov. 11, 2021. The entire content of the priority application is incorporated herein by reference.

BACKGROUND ART

There is a known image recording apparatus which heats at least one of a sheet and a liquid discharged onto the sheet to thereby fix the liquid to the sheet. For example, a publicly known image recording apparatus is provided with a body, a first cover attached to an upper part of the body so that the first cover is rotatable with respect to the body, and a thermal head supported by the body. The thermal head has a heating element which heats an ink ribbon so as to thermally transfer an ink of the ink ribbon to a roll paper.

In the above-described publicly known image recording apparatus, for example, in a case that the first cover is opened so as to release or open the inside of the body for a purpose of dissolving a paper jam, the thermal head is exposed. In this situation, there is such a fear that a user inadvertently or carelessly touches the thermal head.

DESCRIPTION

An object of the present disclosure is to provide an image recording apparatus capable of suppressing the occurrence of such a situation that in a case that the user opens the first cover, the user inadvertently touches a heater such as the thermal head.

According to an aspect of the present disclosure, there is provided an image recording apparatus including: a casing, a first cover, a conveyor, a recording head, a heater and a second cover. The first cover moves to an open position at which the first cover exposes an internal space of the casing to outside, and to a close position at which the first cover covers the internal space. The conveyor conveys a sheet in a conveying direction. The recording head discharges a liquid toward the sheet. The heater is supported by the casing and heats the sheet and/or the liquid on the sheet. The second cover covers the heater. The second cover moves to a cover position at which the second cover covers the heater and to an expose position at which the second cover allows the heater to be exposed to outside.

There is a case, for example, that a user moves the first cover from the close position to the open position as to dissolve a paper jam. Since the heater is covered by the second cover, it is possible to suppress the occurrence of such a situation that the user inadvertently touches the heater. Since the temperature of the air between the second cover and the heater becomes to be high by covering the heater by the second cover, the liquid discharged to the sheet is easily dried. On the other hand, the user is capable of exposing the heater to the outside by moving the second cover from the cover position to the expose position. Accordingly, it is possible to dissolve a paper jam occurred at the position at which the heater is located.

Figure 3:
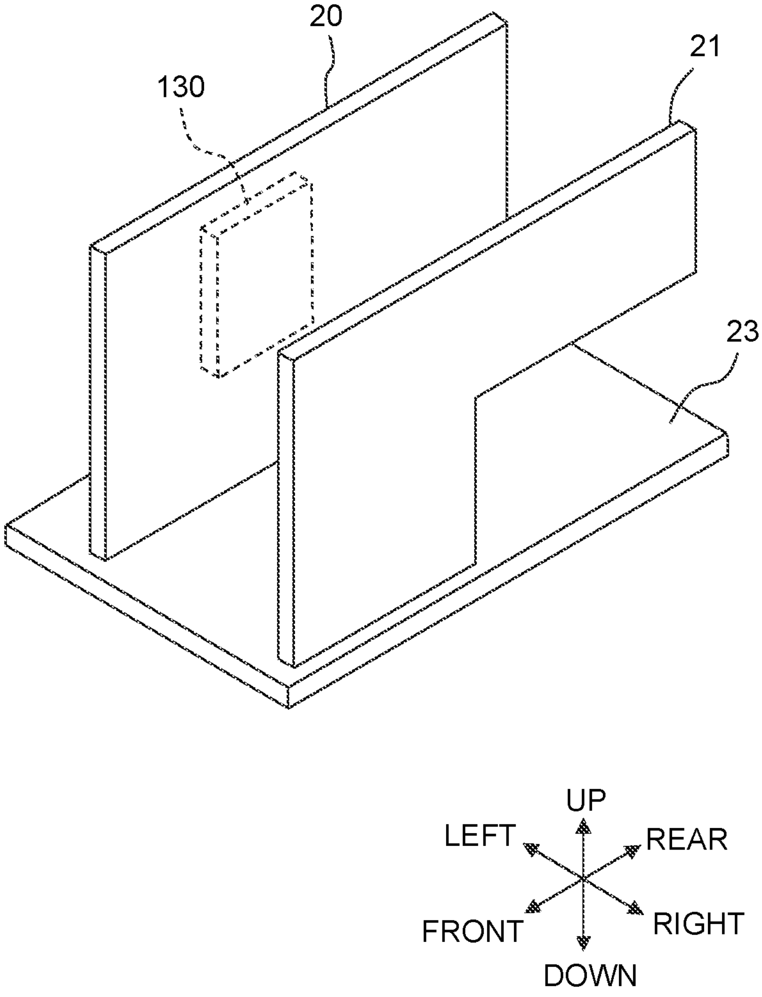

FIG. 3 is a perspective view depicting side frames 20 and 21 attached to a base 23.

Figure 1:
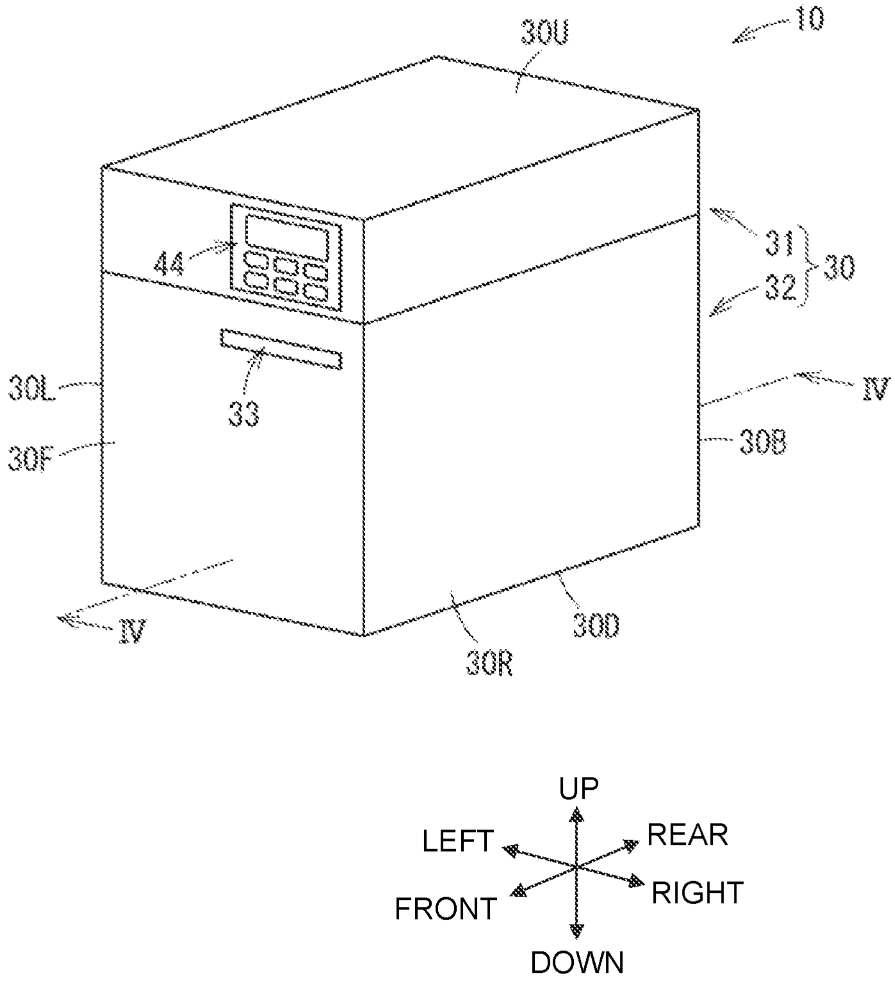
FIG. 1 is a perspective view depicting the outer appearance of an image recording apparatus 10.
Figure 4:
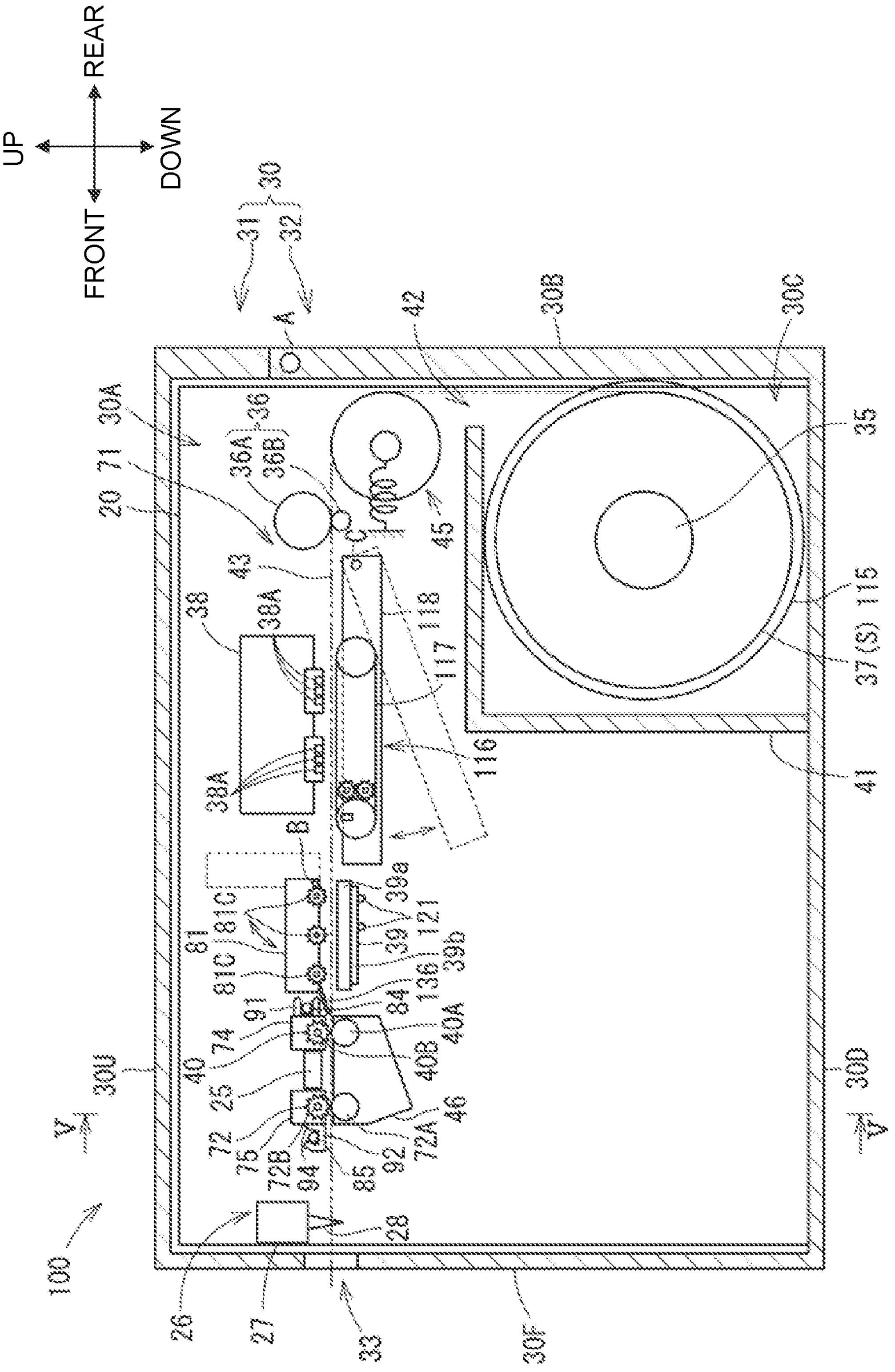

FIG. 4 is a cross-sectional view of a IV-IV cross section of FIG. 1.

Figure 5:
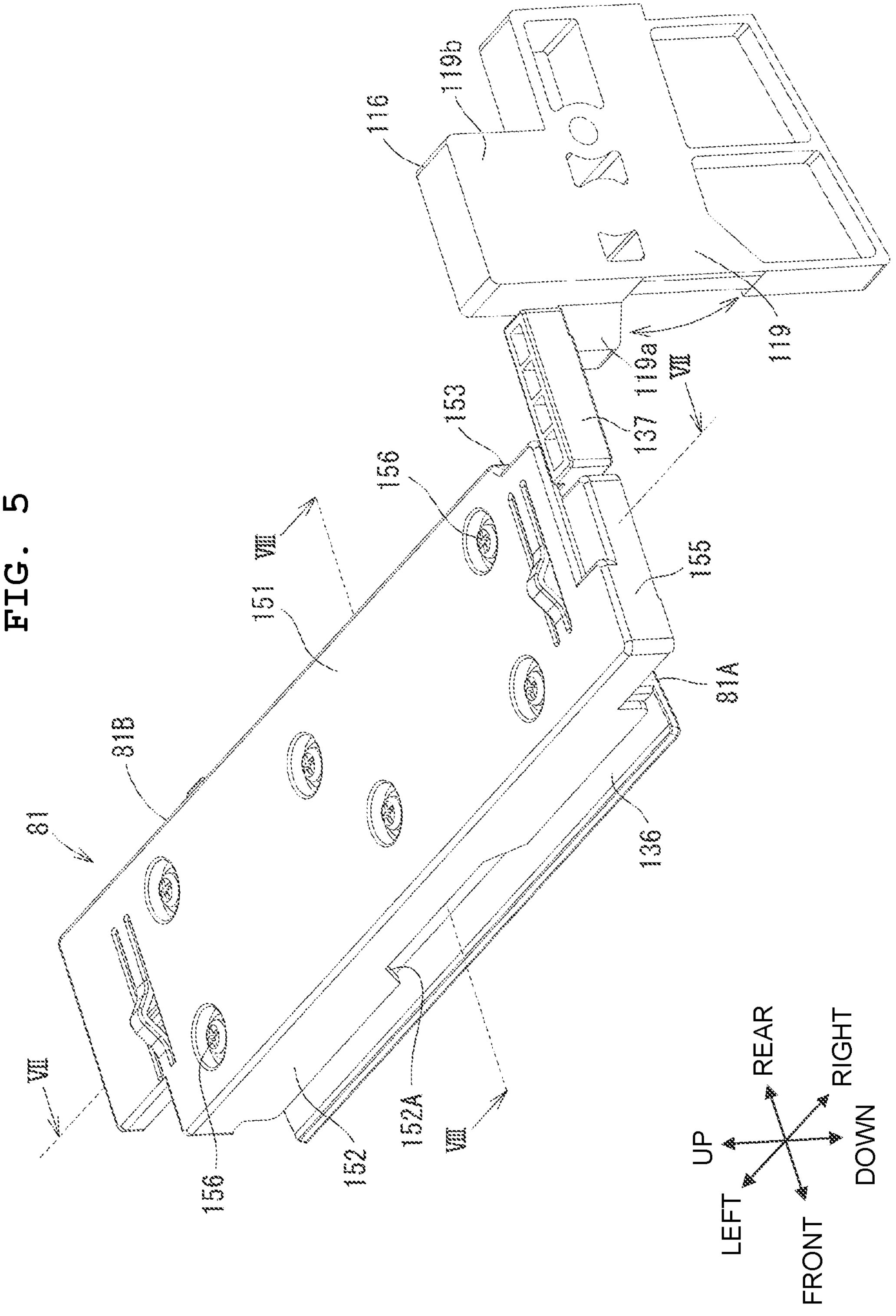

FIG. 5 is a perspective view of a jam cover 81 as seen obliquely thereabove.

Figure 6:
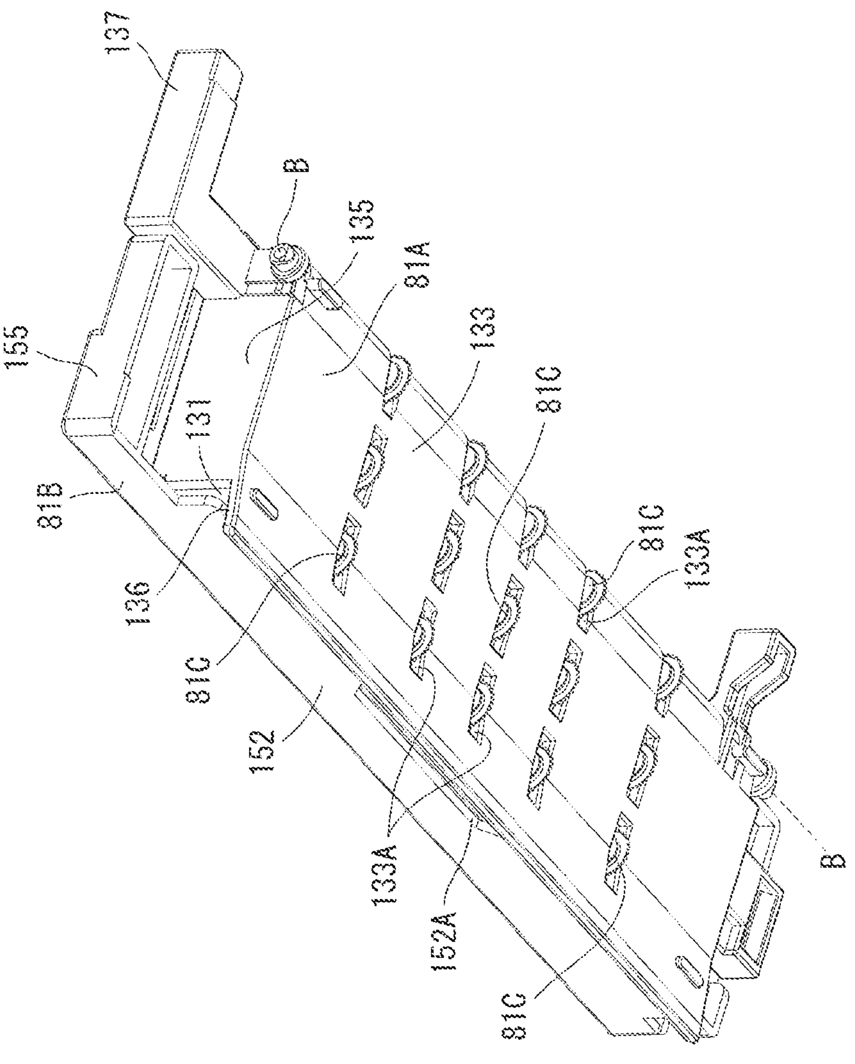

FIG. 6 is a perspective view of the jam cover 81 as seen obliquely therebelow.

Figure 7:
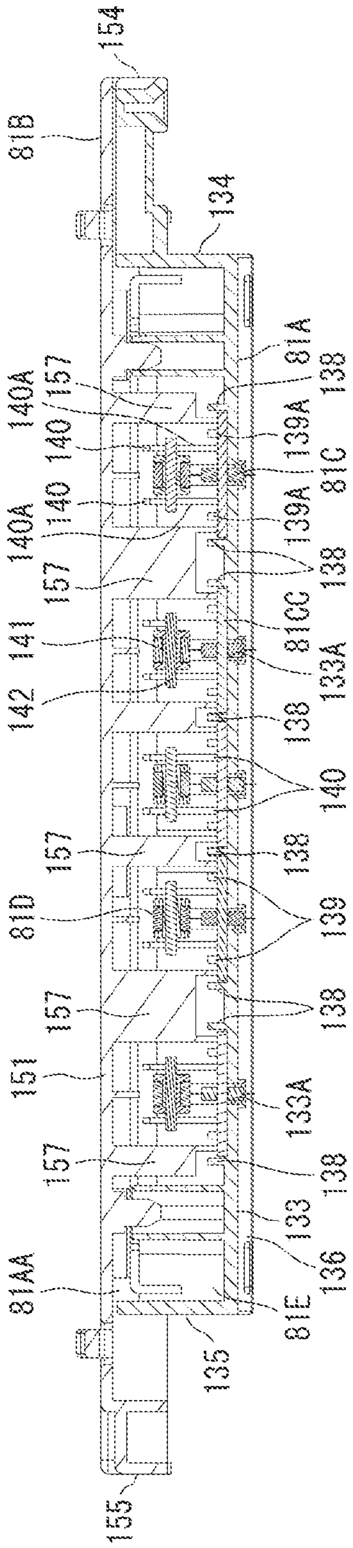

FIG. 7 is a cross-sectional view of a VII-VII cross section of FIG. 5.

Figure 8:
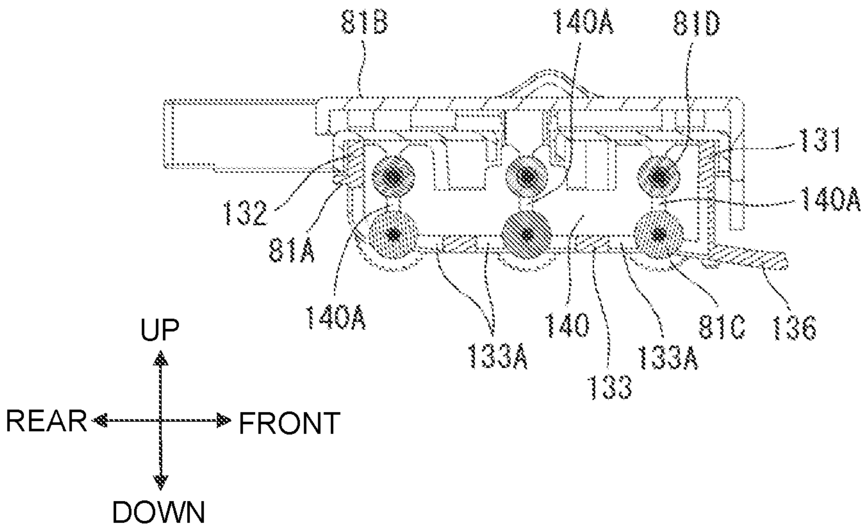

FIG. 8 is a cross-sectional view of a VIII-VIII cross section of FIG. 5.

Figure 9:
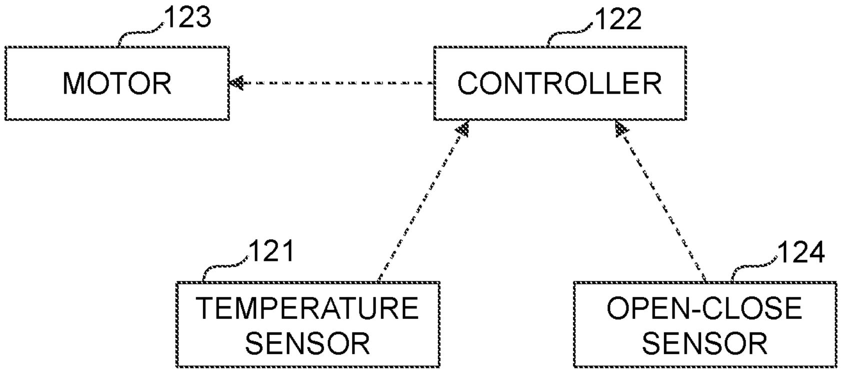

FIG. 9 is a block diagram of a controller 122.

Figure 10:
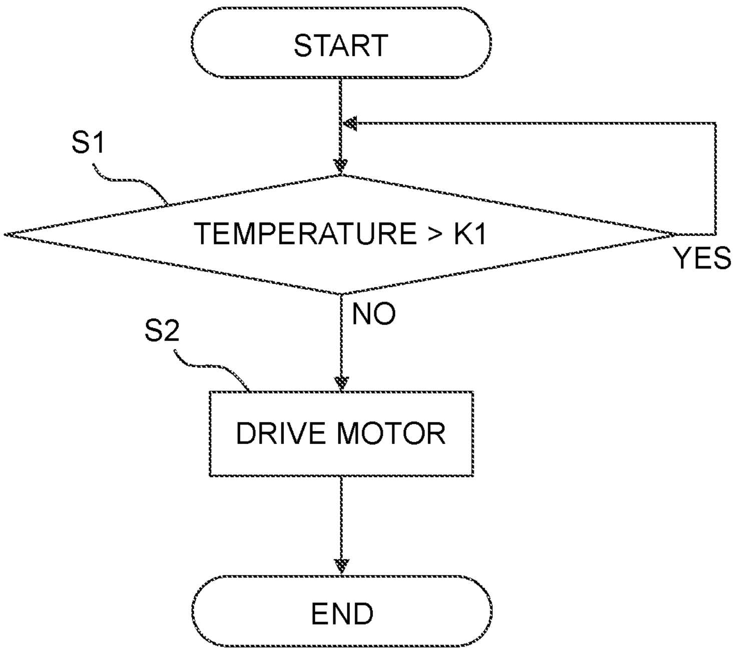

FIG. 10 is a view depicting a processing flow in the controller 122.

Note that an embodiment which is to be explained below is not intend to limit or restrict the present disclosure; it is needless to say that the embodiment can be appropriately changed without changing the gist of the present disclosure. In the following explanation, an orientation in which a discharge port 33 faces or is oriented in a printer part 11 is referred to as "frontward (front, front-side)", an orientation opposite to the frontward (front, front-side) is referred to as "rearward (rear, rear-side)". As depicted in FIG. 1, the up-down direction is defined based on a state that the image recording apparatus 10 is usably arranged. Further, the left-right direction is defined, with the image recording apparatus 10 being seen from the rear.

<Configuration of Outer Appearance of Image Recording Apparatus 10>

The image recording apparatus 10 as depicted in FIG. 1 records, in the ink-jet recording system, an image on a sheet S pulled or drawn from a roll body 37 (see FIG. 4).

As depicted in FIG. 1, the image recording apparatus 10 is provided with a casing 30. The casing 30 is provided with an upper casing 31 (an example of a "first cover") and a lower casing 32 (an example of a "casing"). The upper casing 31 and the lower casing 32 have, as a whole, a shape which is substantially rectangular parallelepiped, and have a size which can be placed on a table, desk, etc. In the following, in a case that an explanation is made regarding the casing 30, the explanation is made assuming that the upper casing 31 and the lower casing 32 have the rectangular parallelepiped shape as a whole.

The casing 30 has a right surface 30R, a left surface 30L, an upper surface 30U, a lower surface 30D, a front surface 30F, and a rear surface 30B. The right surface 30R and the left surface 30L are positioned apart in the left-right direction. The upper surface 30U and the lower surface 30D are positioned apart in the up-down direction. The front surface 30F and the rear surface 30B are positioned apart in the front-rear direction.

Figure 2:
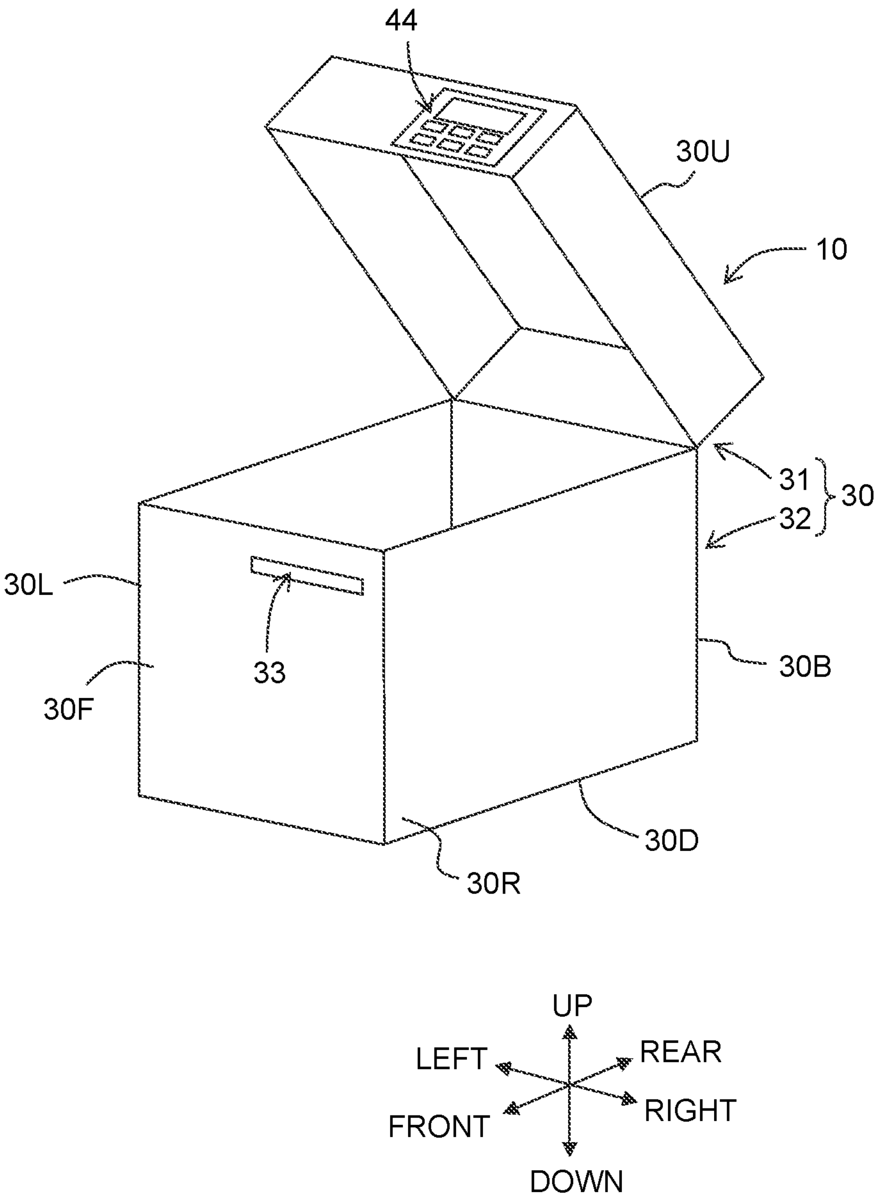
FIG. 2 is a perspective view depicting the outer appearance of the image recording apparatus 10 in a state that an upper casing 31 is opened.

The upper casing 31 is connected to the lower casing 32 to be pivotable (rotatable) about a rotation shaft A (see FIG. 4) which extends in the left-right direction in the rear surface 30B. The upper casing 31 is pivotally moved from a close position depicted in FIG. 1 so that the front surface 30F is lifted upward to pivot (rotate) to an open position depicted in FIG. 2. The upper casing 31 located at the close position does not cause or allows an internal space 30A (FIG. 4) of the casing 30 to be exposed to the outside. On the other hand, the upper casing 31 located at the open position allows the internal space 30A of the casing 30 to be exposed to the outside. Note that in FIG. 2, the internal structure of the casing 30 is omitted.

As depicted in FIG. 1, the front surface 30F of the casing 30 is formed with the discharge port 33 which extends to be slender in the left-right direction. The center part in the left-right direction of the discharge port 33 is positioned on the right side with respect to the center in the left-right direction of the front surface 30F. The discharge port 33 causes the internal space 30A of the casing 30 to communicate with the outside. The sheet S for which image recording has been performed in the internal space 30A of the casing 30 is discharged to the outside of the casing 30 through the discharge port 33.

An operation panel 44 is provided on the front surface 30F of the casing 30. The operation panel 44 is positioned above the discharge port 33. The operation panel 44 receives input, from a user, the input being for operating the image recording apparatus 10 or for confirming a variety of kinds of settings.

As depicted in FIG. 3, two lateral frames 20, 21 are provided on the internal space 30A of the casing 30. Each of the lateral frames 20, 21 has a shape of a flat plate made of a steel plate, and a cutout, a through hole, etc., of which shape(s) is/are in accordance with a member which is supported by each of the lateral frames 20, 21, are formed in each of the lateral frames 20 and 21, as appropriate. The two lateral frames 20, 21 are positioned to be apart from each other in the left-right direction. The lateral frames 20, 21 are connected to a base 23 forming the lower surface 30D of the casing 30. The connection between the lateral frames 20, 21 and the base 23 is made by a screwing, a welding, etc.

<Internal Configuration of Image Recording Apparatus 10>

A roll-body holder 35, a tensioner 45, a conveyor 71, a recording head 38, a heater 39, a jam cover 81 (an example of a "second cover"), a supporting mechanism 116, a supporting member 46, a contact image sensor 25 (CIS 25; an example of a "reader"), a cutter unit 26 are arranged at a location between the lateral frames 20, 21 in the internal space 30A.

As depicted in FIG. 4, in the internal space 30A, a partition wall 41 is provided between the lateral frames 20 and 21. The partition wall 41 is located at a lower part on the rear-side in the internal space 30A. The partition wall 41 partitions a rear lower part of the internal space 30A, while cooperating with the lower casing 32, to define a sheet accommodating space 30C. The sheet accommodating space 30C is a space surrounded by the partition wall 41 and the lower casing 32 and separated or isolated from the recording head 38, etc.

The roll body 37 is accommodated in the sheet accommodating space 30C. The roll body 37 has a core tube and a long sheet S. The sheet S is wound around the core tube in a roll shape in a circumferential direction of the axial core of the core tube. The sheet S may have a width ranging from a minimum width to a maximum width in which the image recording apparatus 10 is capable of recording an image. Namely, a plurality of types of the roll body 37 having different widths are accommodatable in the sheet accommodating space 30C. Note that it is allowable that the roll body 37 does not have the core tube and that the sheet S is wound in a roll shape so that the sheet S is installable in the roll-body holder 35. Also note that the sheet accommodating space 30C may accommodate a fan-folded paper.

The roll-body holder 35 is positioned in the sheet accommodating space 30C. The roll body 37 is installed in the roll-body holder 35. In a case that the roll body 37 is installed in the roll-body holder 35, the roll-body holder 35 supports the roll body 37 so that the roll body 37 is rotatable in the circumferential direction of the axial core of the core tube of the roll body 37 in a state that the axial core of the core tube is along the left-right direction.

The roll-body holder 35 is provided with a pair of side guides 115 separated or apart from each other in the left-right direction. A distance between the pair of side guides 115 in the left-right direction is changeable. A user moves the pair of side guides 115 so as to cause the pair of side guides 115 to make contact, respectively, with left and right ends of the roll body 37, in accordance with the width (the size along the left-right direction) of the roll body 37 to be installed to the roll-body holder 35. The roll body 37 of which left and right ends make contact, respectively, with the pair of side guides 115 is positioned so that the center in the width direction of the sheet S is coincident with the center in the left-right direction of a conveying route 43. The roll-body holder 35 rotates in a case that a driving force from a non-illustrated motor is transmitted to the roll-body holder 35. Accompanying with the rotation of the roll-body holder 35, the roll body 37 supported by the roll-body holder 35 also rotates.

A rear part of the sheet accommodating space 30C is opened upward. Specifically, a gap 42 is defined between the partition wall 41 and the rear surface 30B, namely, at a position above a rear end of the roll body 37. The sheet S is drawn upward from the rear end of the roll body 37, and the drawn sheet S is guided to the tensioner 45 via the gap 42.

At a rear part of the internal space 30A, the tensioner 45 is positioned above the partition wall 41. The tensioner 45 is a roller supported by the lateral frames 20, 21 so that the tensioner 45 is rotatable. The tensioner 45 is supported by the lateral frames 20, 21 so that the tensioner 45 is movable in the front-rear direction. A rearward urging force is applied to the tensioner 45 by an urging member such as a spring, etc.

The conveyor 71 draws the sheet S from the roll body 37, and conveys the sheet S frontward (an example of a "conveying direction"). The conveyor 71 has a conveying roller pair 36, a first discharging roller pair 40, and a second discharging roller pair 72.

The conveying roller pair 36 is positioned in front of the tensioner 45. The conveying roller pair 36 has a conveying roller 36A and a pinch roller 36B. The conveying roller 36A is rotatably supported by the lateral frames 20 and 21. The conveying roller 36A rotates by a driving force transmitted thereto from a non-illustrated motor, thereby conveying the sheet S frontward while nipping the sheet S between the conveying roller 36A and the pinch roller 36B.

The first discharging roller pair 40 is positioned in front of the conveying roller pair 36. The first discharging roller pair 40 has a discharging roller 40A which makes contact with a lower surface of the sheet S, and a spur 40B (an example of a "second rotating body") which makes contact with an upper surface of the sheet S. The discharging roller 40A is rotatably supported by the lateral frames 20, 21. The discharging roller 40A rotates by a driving force transmitted thereto from a non-illustrated motor, thereby conveying the sheet S frontward while nipping the sheet S between the discharging roller 40A and the spur 40B. The spur 40B is rotatably supported by a first spur holder 74.

The first spur holder 74 is formed to have a box shape having an internal space spreading in the front-rear direction, the up-down direction and the left-right direction. The first spur holder 74 has a plurality of pieces of the spur 40B which project downward from a lower end of the first spur holder 74. A first fitting part 91, to which a first shaft 84 extending in the left-right direction is detachably and attachably fitted, is formed in an outer surface on the rear-side (rear outer surface) of the first spur holder 74. The first shaft 84 is fixed to an internal frame (not depicted in the drawings)

fixed to an inner wall surface of the upper casing 31. Note that the first shaft 84 may be fixed to the lateral frames 20, 21 which are fixed to the base 23 of the lower casing 32.

The first spur holder 74 is formed of a material made of a resin. The material of the first spur holder 74 is not particularly limited, provided that the material is capable of securing a strength and a heat-resisting property which are of not less than a certain level. For example, the first spur holder 74 is formed of polypropylene, polycarbonate, a phenol resin, etc.

The second discharging roller pair 72 is positioned in front of the first discharging roller pair 40. The second discharging roller pair 72 has a discharging roller 72A which makes contact with the lower surface of the sheet S, and a spur 72B which makes contact with the upper surface of the sheet S. The discharging roller 72A is rotatably supported by the lateral frames 20, 21. The discharging roller 72A rotates by a driving force transmitted thereto from a non-illustrated motor, thereby conveying the sheet S frontward while nipping the sheet S between the discharging roller 72A and the spur 72B. The spur 72B is rotatably supported by a second spur holder 75.

The second spur holder 75 is formed to have a box shape having an internal space spreading in the front-rear direction, the up-down direction and the left-right direction. The second spur holder 75 has a plurality of pieces of the spur 72B which project downward from a lower end of the second spur holder 75. A second fitting part 92, to which a second shaft 85 extending in the left-right direction is detachably and attachably fitted, is formed in an outer surface on the front-side (front outer surface) of the second spur holder 75. The second shaft 85 is fixed to the internal frame (not depicted in the drawings) fixed to the inner wall surface of the upper casing 31. Note that the second shaft 85 may be fixed to the lateral frames 20, 21 which are fixed to the base 23 of the lower casing 32. The second spur holder 75 is connected to the first spur holder 74 in the front-rear direction by a connecting member (not depicted in the drawings) which extends in the front-rear direction. Note that it is allowable that the second spur holder 75 is not connected to the first spur holder 74.

The second spur holder 75 is formed of a material made of a resin. The material of the second spur holder 75 is not particularly limited, provided that the material is capable of securing a strength and a heat-resisting property which are of not less than a certain level. For example, the second spur holder 75 is formed of polypropylene, polycarbonate, a phenol resin, etc.

The recording head 38 is positioned at a location which is in front of (on the front-side with respect to) the conveying roller pair 36 and behind (on the rear-side with respect to) the first discharging roller pair 40. The recording head 38 has a plurality of nozzles 38A. Each of the plurality of nozzles 38A discharges or ejects an ink (an example of a "liquid"), as a liquid droplet, toward the sheet S supported by a conveying belt 117. With this, an image is recorded on the upper surface of the sheet S. A non-illustrated tank which stores the ink is connected to the recording head 38 by a non-illustrated tube so that the ink can be supplied from the tank to the recording head 38.

As the ink, a water-based ink which includes water, a pigment and thermoplastic resin fine particles is used. Note that the ink is not particularly limited, provided that the ink can be fixed to the sheet S by heating. In the present embodiment, the ink adhered to the sheet S is heated by the heating part 39 to thereby melt the thermoplastic resin fine particles; and then the ink is subjected to cooling thereafter to thereby cure or harden the molten resin, thereby fixing the pigment included in the ink to the sheet S.

The heater 39 is positioned, in the front-rear direction, between the recording head 38 and the first discharging roller pair 40. The heater 39 is fixed to the lateral frames 20, 21. The heater 39 has: a metallic plate 39*a* which has a shape of a flat plate and which spreads in the front-rear direction and the left-right direction; and a polyimide heater 39*b* which is fixed to a lower surface of the metallic plate 39*a*. The metallic plate 39*a* supports the lower surface of the sheet S which is being conveyed frontward by the conveying belt 117. Accordingly, a size in the left-right direction of the metallic plate 39*a* is greater than the maximum width, of the sheet S, in which the image recording apparatus 10 is capable of recording an image. The polyimide heater 39*b* heats the lower surface of the metallic plate 39*a*. With this, while the sheet S is passing on the metallic plate 39*a*, the thermoplastic resin fine particles included in the ink is melt by the heat of the metallic plate 39*a*, and the molten resin is cured by a colling by the atmosphere after the sheet S has passed the metallic plate 39*a*, thereby fixing the pigment to the upper surface of the sheet S. Note that it is allowable to heat the metallic plate 39*a* by a heater, such as an infrared heater, rather than by the polyimide heater 39*b*.

A temperature sensor 121 configured to detect the temperature of the metallic plate 39*a* of the heater 39 is arranged at a location between the lateral frames 20, 21 in the internal space 30A. In the present embodiment, two pieces of the temperature sensor 121 are fixed to the lower surface of the polyimide heater 39*b*. Each of the two temperature sensors 121 outputs a detection signal in accordance with the temperature of the polyimide heater 39*b* to a controller 122 (to be described later on). Note that the temperature sensor 121 may be fixed to the metallic plate 39*a*. Further, the temperature sensor 121 is not particularly limited, provided that the temperature sensor 121 is capable of outputting the detection signal in accordance with the temperature. For example, the temperature sensor 121 is exemplified by an infrared temperature sensor.

The jam cover 81 is arranged at a location above the heater 39. The jam cover 84 faces the heater 39 in the up-down direction. The jam cover 81 is formed of a material made of a resin. The material of the jam cover 81 is not particularly limited, provided that the material is capable of securing a strength and a heat-resisting property which are of not less than a certain level. For example, the jam cover 81 is formed of polypropylene, polycarbonate, a phenol resin, etc.

The jam cover 81 is formed to have a box shape having an internal space 81E which has a rectangular parallelepiped shape spreading in the front-rear direction, the up-down direction and the left-right direction. As depicted in FIGS. 5 to 7, the jam cover 81 has a cover body 81A which is opened upward, a lid wall 81B configured to close an opening 81AA of the cover body 81A, a plurality of spurs 81C (an example of a "first rotating body"), and a plurality of spur cleaners 81D. The cover body 81A has a front wall 131 defining a front end of the internal space 81E, a rear wall 132 defining a rear end of the internal space 81E, a left wall 133 defining a left end of the internal space 81E, and a right wall 134 defining a right end of the internal space 81E.

The front wall 131 has a shape of a flat plate which has a thickness in the front-rear direction. The front wall 131 spreads in the up-down direction and the left-right direction. A front surface and a rear surface of the front wall 131 each have a rectangular shape which is longer in the left-right direction than in the up-down direction. A length in the left-right direction of the front wall 131 is longer than a length in the left-right direction of the metallic plate 39*a* of the heater 39. The front wall 131 overlaps, in the front-rear direction, with the rear outer surface of the first spur holder 74.

A guide wall 136 extending frontward from a lower end of the front wall 131 is formed. The guide wall 136 has a shape of a flat plate which has a thickness in the up-down direction. The guide wall 136 spreads in the front-rear direction and the left-right direction. The guide wall 136 spreads from a left end and reaches up to a right end of the front wall 131. An upper surface and a lower surface of the guide wall 136 each have a rectangular shape which is longer in the left-right direction than in the front-rear direction. As depicted in FIG. 4, a front end of the guide wall 136 is positioned at the front-side with respect to a front end of the metallic plate 39*a* of the heater 39. The upper surface and the lower surface of the guide wall 136 are inclined slightly downward. The guide wall 136 overlaps, in the up-down direction, with the first fitting part 91 of the first spur holder 74.

The rear wall 132 is positioned at the rear-side with respect to the front wall 131. The rear wall 132 has a shape of a flat plate which has a thickness in the front-rear direction. The rear wall 132 spreads in the up-down direction and the left-right direction. The rear wall 132 faces the front wall 131 in the front-rear direction. A front surface and a rear surface of the rear wall 132 each have a rectangular shape which is longer in the left-right direction than in the up-down direction. A length in the left-right direction of the rear wall 132 is longer than the length in the left-right direction of the metallic plate 39*a* of the heater 39.

The bottom wall 133 closes a location between the lower end of the front wall 131 and a lower end of the rear wall 132. The bottom wall 133 has a shape of a flat plate which has a thickness in the up-down direction. The bottom wall 133 spreads in the front-rear direction and the left-right direction. An upper surface and a lower surface of the bottom wall 133 each have a rectangular shape which is longer in the left-right direction than in the front-rear direction. A length in the left-right direction of the bottom wall 133 is longer than the length in the left-right direction of the metallic plate 39*a* of the heater 39.

The bottom wall 133 is formed with a plurality of first slits 133A which penetrate the bottom wall 133 in the up-down direction. The plurality of first slits 133A extend in the front-rear direction. The plurality of first slits 133A are arranged in the front-rear direction and in the left-right direction with a spacing distance therebetween. In the present embodiment, the plurality of first slits 133A are arranged such that three first slits 133A are arranged in the front-rear direction with the spacing distance therebetween and that five first slits 133A are arranged in the left-right direction with the spacing distance therebetween. Each of the plurality of spurs 81C protrudes to a location below the bottom wall 133 via one of the plurality of first slits 133A. The number (quantity) of the first slit 133A corresponds to the number (quantity) of the spur 81C.

The left wall 134 connects a left end of the front wall 131, a left end of the rear wall 132 and a left end of the bottom wall 133. The left wall 134 has a shape of a flat plate which has a thickness in the left-right direction. The left wall 134 spreads in the front-rear direction and the up-down direction.

The right wall 135 connects a right end of the front wall 131, a right end the rear wall 132 and a right end of the bottom wall 133. The right wall 135 has a shape of a flat plate which has a thickness in the left-right direction. The right wall 135 spreads in the front-rear direction and the up-down direction. The right wall 135 faces the left wall 134 in the left-right direction. A projecting part 137 extending rearward is formed on a right surface of the right wall 135. The projecting part 137 projects up to a location on the rear-side with respect to a rear surface of the rear wall 132. The projecting part 137 is formed in the right surface of the right wall 135, at an upper part on the side of the rear end thereof. The projecting part 137 is formed to have a shape of a letter "L" which extends rightward from the right surface of the right wall 135 and is bent rearward. A lower end of the projecting part 137 is located closely to a lower lock piece 119*a* of a lock part 119 (to be described later on) in the supporting mechanism 116 which is at a first position (to be described later on) (see FIG. 5).

As depicted in FIG. 7, a plurality of regulating pieces 138 extending upward from the upper surface of the bottom wall 133 are formed in the upper surface of the bottom wall 133. The plurality of regulating pieces 138 are arranged so that two pieces of the plurality of regulating pieces 138 sandwich each of the plurality of first slits 133A therebetween in the left-right direction. Two regulating pieces 138 among the plurality of regulating pieces 138 sandwiching each of the plurality of first slits 133A therebetween are positioned with equal spacing distances from the first slit 133A in the left-right direction. Each of the plurality of regulating pieces 138 has a shape of a flat plate spreading in the front-rear direction and the up-down direction. The spacing distance between the two first regulating pieces 138 sandwiching one of the plurality of first slits 133A in the left-right direction of is slightly longer than a length in the axial direction (axial length) of a first rotating shaft 81CC of the spur 81C.

Two first supporting pieces 139 extending upward from the upper surface of the bottom wall 133 are formed between the two regulating pieces 138 sandwiching each of the plurality of first slits 133A. The two first supporting pieces 139 are positioned with equal spacing distances from the first slit 133A in the left-right direction. Each of the two first supporting pieces 139 has a shape of a flat plate spreading in the front-rear direction and the up-down direction. Each of the two first supporting pieces 139 is formed with a second slit 139A which is opened in an upper end of the first supporting piece 139 and which extends downward. The second slit 139 reaches, from the upper end of each of the two first supporting pieces 139, to the upper surface of the bottom wall 133. The second slit 139 is positioned at an intermediate position in the front-rear direction of each of the two first supporting pieces 139.

As depicted in FIGS. 7 and 8, two second supporting pieces 140 extending upward from the upper surface of the bottom wall 133 are formed between the two first supporting pieces 139 sandwiching each of the plurality of first slits 133A. The two second supporting pieces 140 face each other, in the left-right direction, with equal spacing distances from the first slit 133A in the left-right direction. Each of the two second supporting pieces 140 has a shape of a flat plate spreading in the front-rear direction and the up-down direction. Each of the two second supporting pieces 140 extends from the rear surface of the front wall 131 up to the front surface of the rear wall 132. Each of the two second supporting pieces 140 extends upward to a location above one of the two first supporting pieces 139. A spacing distance in the left-right direction between the two second supporting pieces 140 sandwiching each of the plurality of first slits 133A is slightly longer than an axial length of a rotating part 141 of each of the plurality of spur cleaners 81D. Each of the two second supporting pieces 140 is formed with three third slits 140A which are opened in an upper end of the second supporting piece 140 and which extends downward. The three third slits 140A are arranged in the front-rear direction with equal spacing distances therebetween. The three third slits 140A extend from the upper end of each of the two second supporting pieces 140 and reaches up to the upper surface of the bottom wall 133. The three third slits 140A overlap, in the left-right direction, with the second slits 139A, of the two first supporting piece 139, which sandwich each of the plurality of first slits 133A therebetween.

The lid wall 81B has a top plate part 151 defining an upper end of the internal space 81E; a front plate part 152 extending downward from a front end of the top plate part 151; a rear plate part 153 extending downward from a rear end of the top plate part 151; a left plate part 153 extending downward from a left end of the top plate part 151; and a right plate part 155 extending downward from a right end of the top plate part 151.

The top plate part 151 has a shape of a flat plate which has a thickness in the up-down direction. The top plate part 151 spreads in the front-rear direction and the left-right direction. The top plate part 151 closes a location among an upper end of the front wall 131 and an upper end of the rear wall 132, an upper end of the left wall 134 and an upper end of the right wall 135 of the cover body 81A. Namely, the top plate part 151 closes the opening 81AA of the cover body 81A. The front end of the top plate part 151 is positioned in front of (on the front-side with respect to) the front wall 131 of the cover body 81A. The rear end of the top plate part 151 is positioned behind (on the rear-side with respect to) the rear wall 132 of the cover body 81A. The left end of the top plate part 151 is positioned on the left side with respect to the left wall 134 of the cover body 81A. The right end of the top plate part 151 is positioned on the right side with respect to the right wall 135 of the cover body 81A. An upper surface and a lower surface of the top plate part 151 have a rectangular shape which is longer in the left-right direction than in the front-rear direction.

The front plate part 152 has a shape of a flat plate which has a thickness in the front-rear direction. The front plate part 152 spreads in the up-down direction and the left-right direction. The front plate part 152 spreads from the left end and reaches up to the right end of the top plate part 151. The front plate part 152 extends downward up to a position close to the guide wall 136. A grasping part (gripping part) 152A which is recessed upward from a lower end of the front plate part 152A is formed in an intermediate part in the left-right direction of the front plate part 152. The grasping part 152A is configured such that a user hooks a finger to the grasping part 152A so as to cause the jam cover 81 to rotate easily from a cover position to an expose position (to be described later on).

The rear plate part 153 has a shape of a flat plate which has a thickness in the front-rear direction. The rear plate part 153 spreads in the up-down direction and the left-right direction. The rear plate part 153 spreads from the left end and reaches up to the right end of the top plate part 151. A length in the up-down direction of the rear plate part 153 is shorter than a length in the 1 up-down direction of the front plate part 152.

The left plate part 154 closes a location among the left end of the front plate part 152, the left end of the rear plate part 153, and the left end of the top plate part 151. The left plate part 154 has a shape of a flat plate which has a thickness in the left-right direction. The left plate part 154 spreads in the front-rear direction and the up-down direction. A length in the up-down direction of the left plate part 154 is shorter than the length in the up-down direction of the front plate part 152.

The right plate part 155 closes a location among the right end of the front plate part 152, the right end of the rear plate part 153, and the right end of the top plate part 151. The right plate part 155 has a shape of a flat plate which has a thickness in the left-right direction. The right plate part 155 spreads in the front-rear direction and the up-down direction. A length in the up-down direction of the right plate part 155 is shorter than the length in the up-down direction of the front plate part 152.

As depicted in FIG. 5, the lid wall 81B is fixed to the cover body 81A by a plurality of screws 156 which are arranged on the upper surface of the top plate part 151. As depicted in FIG. 7, the lower surface of the top plate part 151 is formed with a plurality of ribs 157 which extend downward from the lower surface of the top plate part 151. The plurality of ribs 157 are arranged in the front-rear direction and in the left-right direction, with a spacing distance therebetween. The plurality of ribs 157 are formed to have a forward end part (tip end part) which has a bifurcated shape so as to avoid the plurality of regulating pieces 138.

The spurs 81C and the plurality of spur cleaners 81D are incorporated into the jam cover 81. The spurs 81C are in a state of being projecting (protruding) to a location below the bottom wall 133 via one of the plurality of first slits 133A, and the first rotating shaft 81CC of each of the spurs 81 is rotatably supported by the two first supporting pieces 139 and the two second supporting pieces 140. Each of the spurs 81C is positioned in the left-right direction by both ends in the axial direction of the first rotating shaft 81CC approaching closely to the two regulating pieces 138 sandwiching one of the plurality of first slits 133A.

A second rotating shaft 142 of each of the plurality of spur cleaners 81D is rotatably supported by the two supporting pieces 140. Each of the plurality of spur cleaners 81D is positioned in the left-right direction by end surfaces in the axial direction of the rotating part 141 of each of the plurality of spur cleaners 81D approaching closely to the two supporting pieces 140. By the lid wall 81B being fixed to the cover body 81A by the plurality of screws 156, the spurs 81C and the plurality of spur cleaners 81D are prevented, by the lid wall 81B, from detached or falling out from the inside of the cover body 81A, and there is provided a state that a forward end part of each of the plurality of ribs 157 makes contact with the first rotating shaft 81CC of one of the spurs 81C from thereabove, thereby positioning the spurs 81C in the up-down direction.

As depicted in FIGS. 4 and 6, the jam cover 81 is attached to the lateral frames 20, 21 so that the jam cover 81 is rotatable about a rotation shaft B extending in the left-right direction. The rotation shaft B is arranged in a lower part in an end part on the rear-side of the cover body 81A. The jam cover 81 is rotatable between a cover position at which the jam cover 81 covers the heater 39 so that the heater 39 is not exposed to the outside and to an expose position at which the jam cover 81 allows the heater 39 to be exposed to the outside. In the present embodiment, the jam cover 81 at the cover position covers a location above the heater 39 (see a sold line in FIG. 4). The jam cover 81 at the expose position allows the heater 39 to be exposed to the outside, via an opening at a location above the loser casing 32 (see a broken line in FIG. 4).

The supporting mechanism 116 is positioned between the heater 39 and the conveying roller pair 36. The supporting mechanism 116 is positioned at a location below the recording head 38. The supporting mechanism 116 faces the recording head 38 in the up-down direction. The supporting mechanism 116 has the conveying belt 117, a supporting part 118 configured to support the conveying belt 117, a lock part 119 formed in the supporting part 118.

A driving force from a non-illustrate motor is transmitted to the conveying belt 117 so as to drive and rotate the conveying belt 117 so that the conveying belt 117 conveys the sheet S frontward while supporting the lower surface of the sheet S. The supporting part 118 spreads in the front-rear direction and the left-right direction. The lock part 119 extends upward from a right end part (an end part on the right side) in a front end part of the supporting part 118. As depicted in FIG. 5, the lock part 119 has a lower lock piece 119*a* (an example of a "lock mechanism") which is located closely to the lower end of the projecting part 137 of the jam cover 81, and a rear lock piece 119*b* which is located closely to the rear end of the projecting part 137. Note that the rear lock piece 119*b* may be omitted. The lower lock piece 119*a* may make contact with the lower end of the projecting part 137.

As depicted in FIG. 4, in a case that a motor 123 (see FIG. 9) is driven, the supporting mechanism 116 is configured to rotate about a rotation shaft C extending in the left-right direction. The rotation shaft C is positioned at a rear end part (an end part on the rear-side) of the supporting mechanism 116. The supporting mechanism 116 is configured to be rotatable between a first position (see a solid line in FIG. 4) at which the supporting mechanism 116 faces the recording head 38 in the up-down direction, and a second position at which a front end part of the supporting mechanism 116 is rotated to be apart from the recording head 38 than at the first position (see broken line in FIG. 4). With this, the lower lock piece 119*a* of the lock part 119 of the supporting mechanism 116 which is at the first position is configured to make contact with the lower end of the projecting part 137 of the jam cover 81 which is being moved from the cover position to the expose position. As a result, the movement of the jam cover 81 from the cover position to the expose position is inhibited or prevented. Further, the lower lock piece 119*a* of the lock part 119 of the supporting mechanism 116 which is at the second position is configured to not make contact with the lower end of the projecting part 137 of the jam cover 81 which is being moved from the cover position to the expose position. As a result, the movement of the jam cover 81 from the cover position to the expose position is made possible.

The supporting member 46 is positioned in front of the heater 39. A front part of the supporting member 46 faces or is opposite to the spurs 72B in the up-down direction. A rear part of the supporting member 46 faces or is opposite to the spurs 40B in the up-down direction. The supporting member 46 supports the lower surface of the sheet S which is being conveyed frontward by the first discharging roller pair 40.

The CIS 25 is positioned in front of the heater 39. The CIS 25 is positioned above the supporting member 46. The CIS 25 is positioned, in the front-rear direction, between the first discharging roller pair 40 and the second discharging roller pair 72. In a case that a reflected light, of a light emitted or radiated from an light source such as an LED and reflected off (by) the sheet S, is collected by a refractive index distribution type lens and to a line sensor, the CIS 25 is configured to output an electric signal corresponding to the intensity of the reflected light received by the line sensor. The CIS 25 is capable of reading an image on the recording surface (upper surface) of the sheet S. In the CIS 25, the left-right direction is a reading line.

The cutter unit 26 is positioned in front of the second discharging roller pair 72. The cutter unit 26 has a configuration wherein a cutter 28 is mounted on a cutter carriage 27. The cutter carriage 27 moves in the left-right direction, by a non-illustrated belt-driving mechanism, etc. Accompanying with the movement of the cutter carriage 27, the cutter 28 moves also in the left-right direction. By the movement of the cutter 28, the sheet S positioned between the second discharging roller pair 72 and the discharge port 33 is cut along the left-right direction.

As depicted in FIG. 3, a substrate 130 is fixed to the lateral frame 20 at a left side part thereof. An arithmetic element serving as the controller 122, a chip for a communication interface, various connectors, etc., are mounted on the substrate 130. The substrate 130 is connected, by a non-illustrated flat cable, etc., to the recording head 38, the motor(s), the operation panel 44, etc., so that an electrical signal can be transmitted and received. Further, an electric power is supplied from a non-illustrated power supply unit to the substrate 130.

As depicted in FIG. 9, the controller 122 is configured to control the motor 123 which drives the supporting mechanism 116, based on the detection signal outputted from the temperature sensor 121. The controller 122 is configured to start the control of the motor driving the supporting mechanism 116 in a case that the controller 122 receives an open-close signal outputted from an open-close sensor 124 configured to detect that the upper casing 31 is opened.

Next, an operation of the image recording apparatus 10 will be explained.

In a case that the conveying roller 36A of the conveying roller pair 36 rotates, the sheet S is drawn upward from the roll body 37 in the sheet accommodating space 30C, via the gap 42. The sheet S drawn from the roll body 37 is conveyed frontward while being nipped between the conveying roller 36 and the pinch roller 36B. The sheet S conveyed frontward by the conveying roller pair 36 is supported by the supporting part 118 of the supporting mechanism 116. In this situation, the ink is discharged downward from the plurality of nozzles 38 of the recording head 38 to thereby record an image on the upper surface of the sheet S. The sheet S having the image recorded on the upper surface thereof is conveyed frontward by the conveying belt 117.

The sheet S which is (being) conveyed frontward by the conveying belt 117 is supported by the upper surface of the metallic plate 39*a* of the heater 39. While the sheet S is passing on the metallic plate 39*a*, the sheet S and the ink are heated by the heat of the metallic plate 39*a*. With this, the thermoplastic resin fine particles included in the ink are melted, and then are subjected to cooling by the air thereafter to thereby cure or harden the molten thermoplastic resin fine particles, thereby fixing the pigment included in the ink to the sheet S. In this situation, the jam cover 81 covering the location above the heater 39 functions as a heat shielding wall. Accordingly, the heat of the metallic plate 39*a* is less likely to be transmitted to the CIS 25.

The sheet S heated in the heater 39 is conveyed frontward while being nipped between the discharging roller 40A and the spurs 40B of the first discharging roller pair 40A. The sheet S which is being conveyed frontward by the first discharging roller pair 40 is supported by the supporting member 46. In a case that the sheet S is supported by the supporting member 46, the CIS 25 radiates the light from the light source toward the upper surface (recording surface) of the sheet S, and outputs an electric signal in accordance with the intensity of a reflected light of the light reflected off the sheet S. With this, the image of the upper surface (recording surface) of the sheet S is read by the CIS 25.

The sheet S of which image has been read by the CIS 25 is conveyed frontward by the second discharging roller pair 72. The sheet S which is conveyed frontward by the second discharging roller pair 72 is cut along the left-right direction by the cutter unit 26 in a state that a front part of the sheet S is exposed from the discharge port 33 to the outside of the casing 30. The sheet S cut by the cutter unit 26 is discharged from the discharge port 33.

On the other hand, in a case that any jam (paper jam) occurs during the operation of the image recording apparatus 10, the user at first rotates the upper casing 31 from the close position to the open position so as to expose the internal space 30A of the casing 30 to the outside. Next, the user removes or takes out a sheet S jammed or clogged in the conveying route 43. In this situation, since the location above the heater 39 is covered by the jam cover 81, it is possible to suppress the occurrence of such a situation that the user inadvertently touches the fixing par 39.

Next, an explanation will be given, for example, about an operation of the controller 122 in a case that the user rotates the jam cover 81 so as to dissolve the jam occurring during the operation of the image recording apparatus 10.

In a case that the upper casing 31 is opened and that the controller 122 receives the open-close signal from the open-close sensor 124, the controller 122 starts the control of the motor which drives the supporting mechanism 116.

As depicted in FIG. 10, in step S1, the controller 122 determines as to whether or not the temperature corresponding to the detection signal received from the temperature sensor 121 exceeds a predetermined temperature K1. In a case that the controller 122 determines that the temperature corresponding to the detection signal received from the temperature sensor 121 exceeds the predetermined temperature K1 (Step S1: YES), the controller 121 maintains the motor driving the supporting mechanism 166 to be in a non-driving state, and performs the determination of step S1 again. With this, since a state that the lower lock piece 119*a* of the lock part 119 of the supporting mechanism 116 is located closely to the lower end of the projecting part 137 of the jam cover 81 is maintained, the projecting part 137 of the jam cover 81 makes contact with the lower lock piece 119*a* even in a case that the user attempts to rotate the jam cover 81 from the cover position to the expose position. Accordingly, the movement of the jam cover 82 from the cover position to the expose position is inhibited. On the other hand, in a case that the controller 122 determines that the temperature corresponding to the detection signal received from the temperature sensor 121 is not more than the predetermined temperature K1 (Step S1: NO), the controller 122 proceeds the processing to step S2.

In step S2, the controller 122 performs control of driving the motor 123 which drives the supporting mechanism 116. With this, the supporting mechanism 116 rotates from the first position at which the supporting mechanism 116 faces the recording head 38 in the up-down direction to the second position at which the front end part of the supporting mechanism 116 is apart with respect to the recording head 38, and thus the projecting part 137 of the jam cover 81 does not make contact with the lower lock piece 119*a* of the lock part 119 of the supporting mechanism 116 in a case that the user rotates the jam cover 81 from the cover position to the expose position. Accordingly, the user is capable of rotating the jam cover 81 from the cover position to the expose position.

Technical Effect of Embodiment

Since the image recording apparatus 10 is provided with the jam cover 81 configured to cover the heater 39, it is possible, for example, suppress the occurrence of such a situation that in a case that the user moves the upper casing 31 from the close position to the open position in order to dissolve a paper jam, the user inadvertently touches the heater 39. Since the temperature of the air between the jam cover 81 and the heater 39 becomes to be high by covering the heater 39 by the jam cover 81, the liquid discharged to the sheet S is easily dried. On the other hand, since the user is capable of exposing the heater 39 to the outside by moving the jam cover 81 from the cover position to the expose position, it is possible to dissolve a paper jam occurred in the position of the heater 39.

In the image recording apparatus 10, since the controller 122 releases the fixing, by the lock mechanism 116, of the jam cover 81 to the cover position, based on the detection signal outputted by the temperature sensor 121, it is possible to suppress the occurrence of such a situation that the user inadvertently touches the heater 39.

In the image recording apparatus 10, since the lower lock piece 119*a* of the lock part 119 of the supporting mechanism 116 which is at the first position makes contact with the projecting part 137 of the jam cover 81 moving to the expose position, the movement of the jam cover 81 to the expose position is inhibited by the lower lock piece 119*a* of the lock part 119 of the supporting mechanism 116 which is at the first position. Accordingly, the fixing of the jam cover 81 by the supporting mechanism 116 can be maintained in a more ensured manner. On the other hand, since the lower lock piece 119*a* of the lock part 119 of the supporting mechanism 116 which is at the second position does not make contact with the projecting part 137 of the jam cover 81 moving to the expose position, the movement of the jam cover 81 to the expose position is not inhibited by the lower lock piece 119*a* of the lock part 119 of the supporting mechanism 116 which is at the second position. Accordingly, the fixing of the jam cover 81 by the supporting mechanism 116 can be released in a more ensured manner.

In the image recording apparatus 10, since the jam cover 81 is formed to have the box shape having the internal space 81E, the air layer is formed in the inside of the jam cover 81. Accordingly, the radiation heat of the heater 39 is less likely to be transmitted to the jam cover 81, the jam cover 81 is made thereby to easily function as a heat shielding wall with respect to the radiation heat of the heater 39. As a result, since the radiation heat of the heater 39 is less likely reach the CIS 25, it is possible to suppress occurrence of any reading failure by the CIS 25.

In the image recording apparatus 10, since the jam cover 81 has the spurs 81C configured to make contact with the upper surface (recording surface) of the sheet S in the internal space 81E, it is possible to suppress such a situation that the liquid discharged to the sheet S adheres to the jam cover 81. Since the space is defined between the jam cover 81 and the heater 39, the radiation heat of the heater 39 is less likely to be transmitted to the jam cover 81. This makes the jam cover 81 to easily function as the heat shielding wall with respect to the radiation heat of the heater 39.

In the image recording apparatus 10, since the jam cover 81 has, in the internal space 81E, the plurality of spur cleaners 81D each of which is configured to make contact with one of the spurs 81C and to rotate by following the rotation of one of the spurs 81C, it is possible to remove the ink adhered to the spurs 81C by the plurality of spur cleaners 81D.

In the image recording apparatus 10, since the front end part of the jam cover 81 overlaps, in the front-rear direction, with the rear end part of the first spur holder 74, the radiation heat of the heater 39 is less likely reach the first spur holder 74. Accordingly, the first spur holder 74 is made thereby to easily function as a heat shielding wall with respect to the radiation heat of the heater 39, the radiation heat of the heater 39 is less likely reach the CIS 25. Thus, it is possible to suppress occurrence of any reading failure by the CIS 25. Further, the size of the image recording apparatus 10 is made small in the up-down direction.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

<Modification>

In the image recording apparatus 10, although the heater 39 which is configured to fix the ink to the sheet S heats the sheet S and the ink, it is sufficient that the heater 39 heats at least one of the ink and the sheet S. In such a case, it is allowable, for example, that the heater is configured to heat the sheet S in advance, and to cause the ink to fix to the sheet S by the residual heat of the pre-heating.

In the image recording apparatus 10, although the upper casing 31 is attached to the lower casing 32 such that the upper casing 31 is rotatable between the open position at which the upper casing 31 exposes the internal space 30A of the casing 30 to the outside, and to the close position at which the upper casing 31 does not expose the internal space 30A to the outside, it is allowable that the upper casing 31 is attached to the lower casing 32 such that the upper casing 31 is movable between the open position and the close position. For example, it is allowable that the upper casing 31 is attached to the lower casing 32 such that the upper casing 31 is movable, in the front-rear direction, between the open position and the close position with respect to the lower casing 32. Alternatively, the upper casing 31 may be configured to be detachably attachable with respect to the lower casing 32. Still alternatively, it is allowable that a part of the right surface 30R or the left surface 30L of the casing 30 is configured to be movable between the open position and the close position, rather than the upper casing 31.

In the image recording apparatus 10, although the jam cover 81 is attached to the lateral frames 20, 21 so that the jam cover 81 is rotatable between the cover position at which the jam cover 81 covers the heater 39 and the expose position at which the jam cover 81 allows the heater 39 to be exposed to the outside, it is allowable that the jam cover 81 is attached to the lateral frames 20, 21 such that the jam cover 81 is movable between the cover position and the expose position. For example, it is allowable that the jam cover 81 is configured to be movable, in the front-rear direction, between the cover position and the expose position. Alternatively, the jam cover 81 may be configured to be detachably attachable with respect to the lateral frames 20, 21.

The present disclosure may be realized also in the following aspects. The image recording apparatus may include: a lock mechanism which performs fixing of the second cover to the cover position; a temperature sensor which outputs a detection signal in accordance with a temperature of the heater; and a controller. The controller may allow the lock mechanism to release the fixing, based on the detection signal output by the temperature sensor.

Since the controller allows the lock mechanism to release the fixing based on the detection signal output by the temperature sensor, it is possible to suppress the occurrence of such a situation that the user inadvertently touches the heater.

The image recording apparatus may include a supporting mechanism which is configured to face the recording head and which supports the sheet. The supporting mechanism may be movable to a first position at which the supporting mechanism faces the recording head and to a second position at which the supporting mechanism is apart from the recording head than at the first position. It is allowable that the lock mechanism is the supporting mechanism, and that the lock mechanism makes contact with the second cover moving to the expose position in a case that the lock mechanism is moved to the first position, and does not make contact with the second cover moving to the expose position in a case that the lock mechanism is moved to the second position.

The movement of the second cover to the expose position is prevented by the supporting mechanism which is moved to or which is at the first position. Accordingly, the fixing of the second cover by the lock mechanism is maintained in a more ensured manner. Further, by the supporting mechanism which is moved to or which is at the second position, the movement of the second cover to the expose position is not prevented. Due to this, the fixing of the second cover by the lock mechanism is released in a more ensured manner.

The image recording apparatus may further include a reader which is positioned at downstream of the second part in the conveying direction and which reads an image on the sheet. The second cover may define an internal space.

Since the second cover has the internal space, an air layer is formed in the inside of the second cover. Accordingly, since the radiation heat of the heater is less likely to be transmitted to the second cover, the second cover is made thereby to easily function as a heat shielding wall (heat insulating wall) with respect to the radiation heat of the heater. As a result, since the radiation heat of the heater is less likely reach the second cover, it is possible to suppress occurrence of any reading failure (unsatisfactory reading) by the reader.

A first rotating body which makes contact with a recording surface of the sheet may be provided on the internal space defined by the second cover.

It is possible to suppress the occurrence of such a situation that the liquid discharged to the sheet adheres to the second cover. Since a space is defined between the second cover and the heater, the radiation heat of the heater is less likely to be transmitted to the second cover. This makes the second cover to easily function as the heat shielding wall with respect to the radiation heat of the heater.

A cleaner which makes contact with the first rotating body and which rotates by following rotation of the first rotating body may be provided on the internal space defined by the second cover.

It is possible to remove the liquid adhered to the first rotating body by the cleaner.

The image recording apparatus may further include a holder located between the reader and the heater in the conveying direction and supporting a second rotating body which makes contact with a recording surface of the sheet. A downstream end, of the second cover, at downstream in the conveying direction may overlap, in the conveying direction, with an upstream end, of the holder, at upstream in the conveying direction.

Since the downstream end on the downstream in the conveying direction of the second cover overlaps with the upstream end part on the upstream in the conveying direction of the holder, the radiation heat of the heater is less likely to reach the holder. This makes the holder to easily function as a heat shielding wall with respect to the radiation heat of the heater, and thus the radiation heat of the heater is less likely to reach the reader. Accordingly, it is possible to suppress occurrence of any reading failure by the reader. Further, the size of the image recording apparatus is made to be small in the up-down direction.

What is claimed is:

1. An image recording apparatus comprising:
- a casing;
- a first cover configured to move to an opened position at which the first cover exposes an internal space of the casing to outside, and to a closed position at which the first cover covers the internal space;
- a conveyor configured to convey a sheet in a conveying direction;
- a recording head configured to discharge a liquid toward the sheet;
- a heater supported by the casing and configured to heat the sheet and/or the liquid on the sheet;
- a second cover configured to cover the heater, and to move to a covering position at which the second cover covers the heater and to an exposing position at which the second cover allows the heater to be exposed to outside;
- a lock mechanism configured to retain the second cover at the cover position;
- a temperature sensor configured to output a detection signal in accordance with a temperature of the heater; and
- a controller
- is configured to allow the lock mechanism to release the second cover, based on the detection signal output by the temperature sensor.

2. The image recording apparatus according to claim 1, further comprising a reader positioned downstream of the second cover in the conveying direction and configured to read an image on the sheet, wherein
- the second cover defines an internal space.

3. An image recording apparatus comprising:
- a casing;
- a first cover configured to move to an opened position at which the first cover exposes an internal space of the casing to outside, and to a closed position at which the first cover covers the internal space;
- a conveyor configured to convey a sheet in a conveying direction;
- a recording head configured to discharge liquid toward the sheet;
- a heater supported by the casing and configured to heat the sheet and/or the liquid on the sheet;
- a second cover configured to cover the heater, the second cover defining an internal space;
- a reader positioned downstream of the second cover in the conveying direction and configured to read an image on the sheet; and
- a first rotating body located in the internal space defined by the second cover, the first rotating body being configured to make contact with a recording surface of the sheet, wherein
- the second cover is configured to move to a covering position at which the second cover covers the heater and to an exposing position at which the second cover allows the heater to be exposed to outside.

4. The image recording apparatus according to claim 3, further comprising a cleaner located in the internal space defined by the second cover, the cleaner being configured to make contact with the first rotating body and to rotate by following rotation of the first rotating body.

5. An image recording apparatus comprising:
- a casing;
- a first cover configured to move to an opened position at which the first cover exposes an internal space of the casing to outside, and to a closed position at which the first cover covers the internal space;
- a conveyor configured to convey a sheet in a conveying direction;
- a recording head configured to discharge liquid toward the sheet;
- a heater supported by the casing and configured to heat the sheet and/or the liquid on the sheet;
- a second cover configured to cover the heater, the second cover defining an internal space; and
- a reader positioned downstream of the second cover in the conveying direction and configured to read an image on the sheet; and
- a holder located between the reader and the heater in the conveying direction, the holder being configured to support a second rotating body which is configured to make contact with a recording surface of the sheet, wherein
- the second cover is configured to move to a covering position at which the second cover covers the heater and to an expose position at which the second cover allows the heater to be exposed to outside, and
- a downstream end, of the second cover, at downstream in the conveying direction overlaps, in the conveying direction, with an upstream end, of the holder, at upstream in the conveying direction.

6. The image recording apparatus according to claim 1, further comprising a supporting mechanism being configured to face the recording head, the supporting mechanism being configured to support the sheet, wherein
- the supporting mechanism is configured to move to a first position at which the supporting mechanism faces the recording head and to a second position at which the supporting mechanism is apart from the recording head than at the first position, and
- the lock mechanism is the supporting mechanism, and is configured to make contact with the second cover moving to the expose position in a case that the lock mechanism is moved to the first position, and the lock mechanism is configured not to make contact with the second cover moving to the expose position in a case that the lock mechanism is moved to the second position.

7. The image recording apparatus according to claim 6, wherein the lock mechanism includes:

a rotation shaft located at one side in the conveying direction of the lock mechanism and extending in a direction orthogonal to the conveying direction and parallel to a surface of the sheet being conveyed; and a lock piece located at the other side in the conveying direction of the lock mechanism and configured to retain with the second cover at the first position.

8. The image recording apparatus according to claim 7, wherein the second cover includes:

a rotational shaft; and a projecting part located upstream of the rotational shaft of the second cover in the conveying direction, a position of the projecting part at which the second cover is at the second position is lower than a position of the projecting part at which the second cover is at the first position, and the lock piece is configured to retain a lower end of the projecting part of the second cover.

* * * * *